Dec. 27, 1966  C. P. DAHL  3,294,028
PRESSURE LOADED GEAR PUMP
Filed Dec. 23, 1964  2 Sheets-Sheet 2
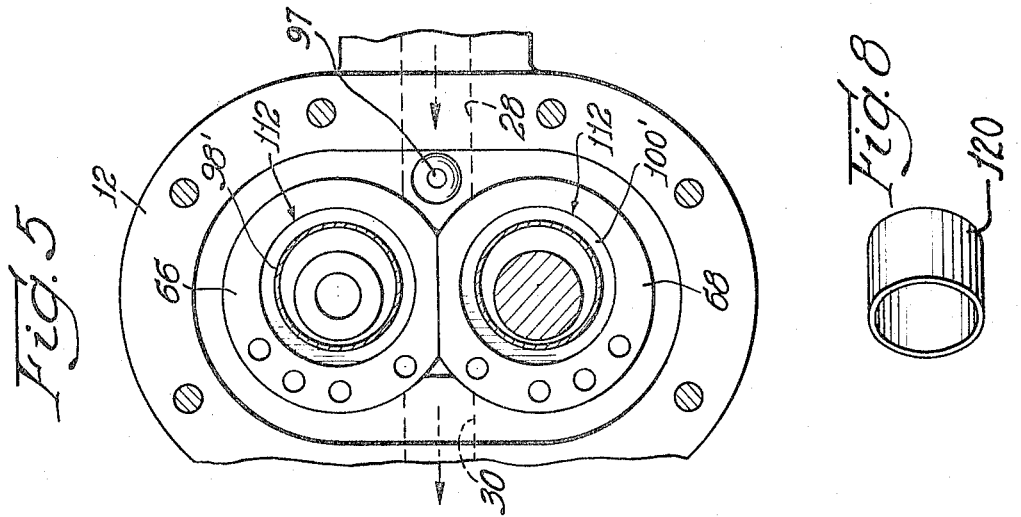
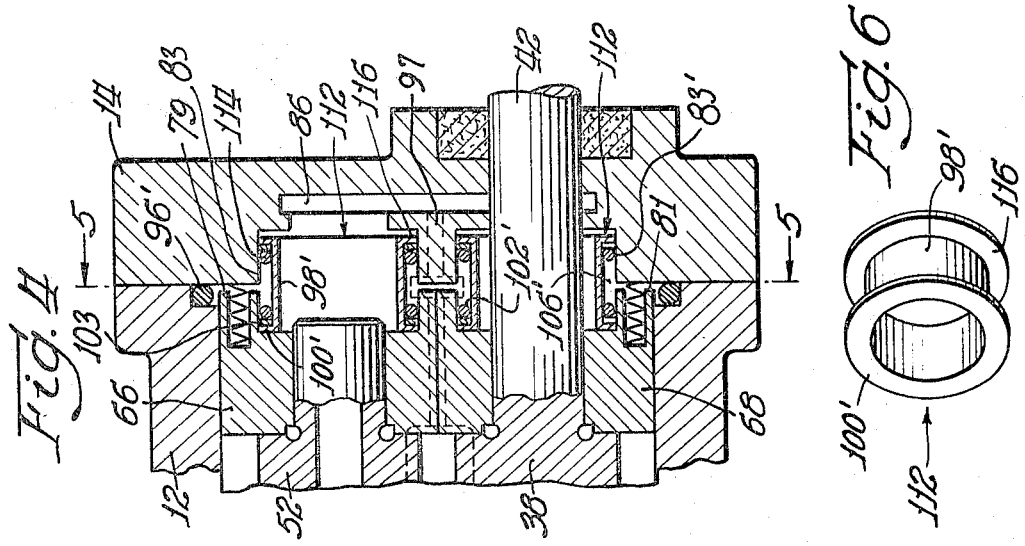
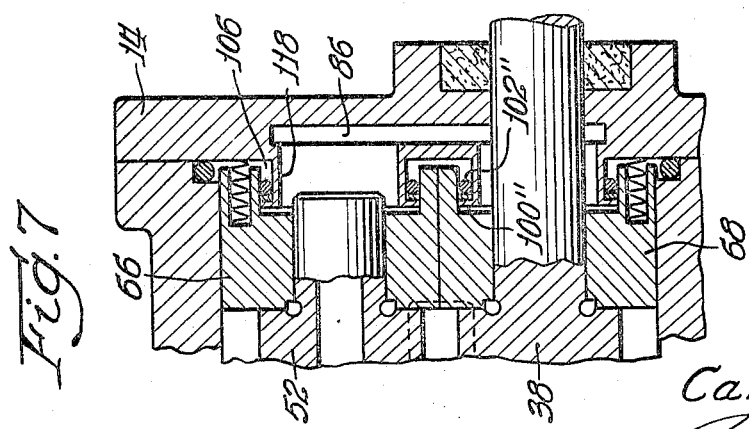
Inventor:
Carl P. Dahl United States Patent Office
3,294,028
Patented Dec. 27, 1966

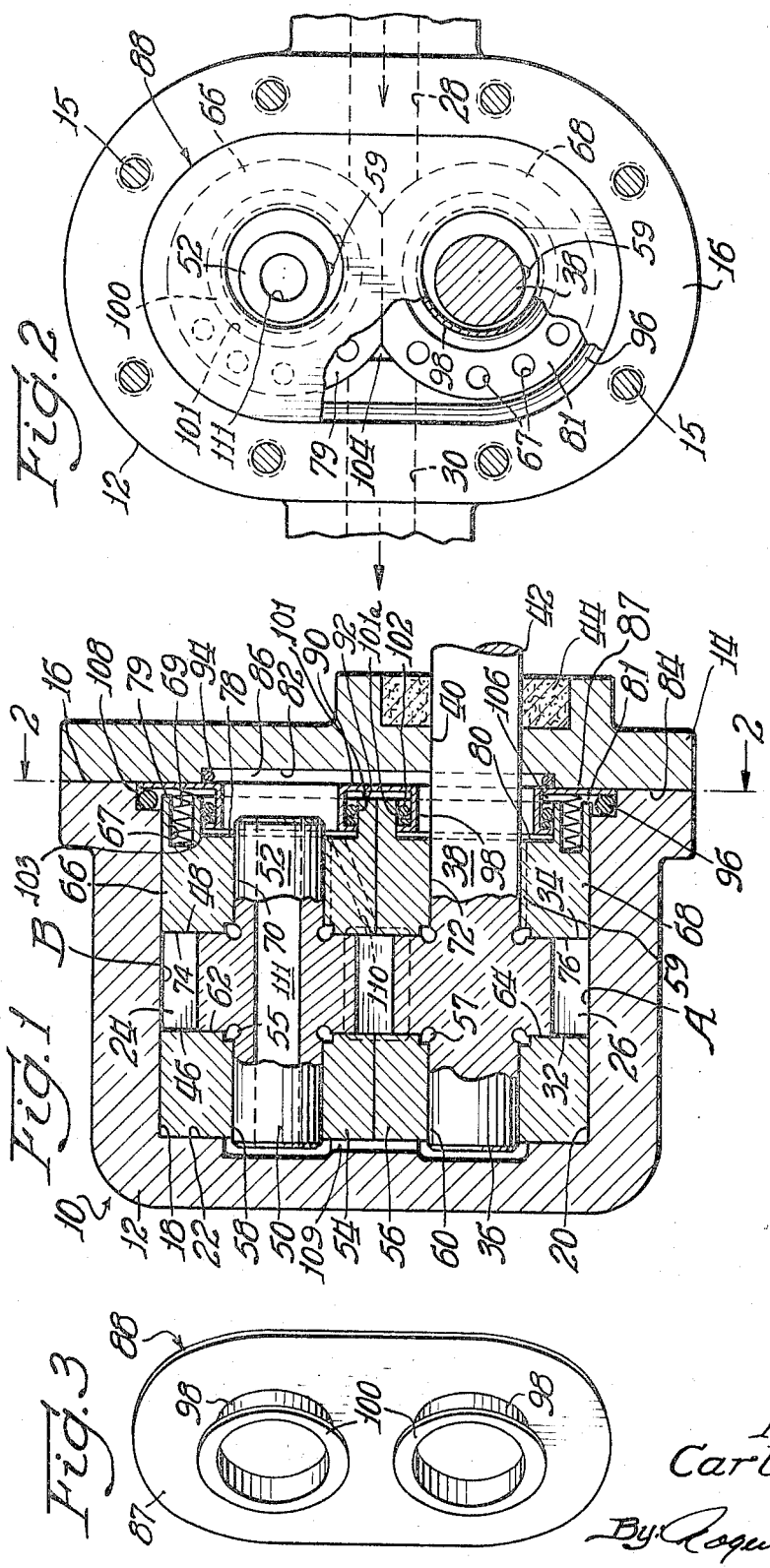

3,294,028
PRESSURE LOADED GEAR PUMP
Carl P. Dahl, Maple Heights, Ohio, assignor to Borg-Warner Corporation, Chicago, Ill., a corporation of Illinois
Filed Dec. 23, 1964, Ser. No. 420,652
9 Claims. (Cl. 103—126)

This invention relates to pressure loaded gear pumps and more particularly to pressure loaded gear pumps that utilize pressure loadable bearing bushings to provide a sealing engagement between the bearings and the side faces of the gears.

Pressure loadable gear pumps are normally provided with two pairs of adjacent bearing bushings, one pair being fixed relative to the housing, the other pair being axially movable, pressure loadable, bearing bushings. The latter bearings are disposed in the housing bores in a manner which allows them to move into sealing engagement with the gear side faces.

It is well known that a pressure gradient condition exists across the front faces of the bearing bushings, i.e., that portion of the bearings adjacent the gear side faces, which condition is caused by the force of fluid conveyed by the gear teeth. This pressure gradient condition is a progressive pressure increase across the gear faces from inlet to outlet which tends to axially move the bearing bushings away from the gear side faces at a greater force on the outlet side than on the inlet side of the pump. Various bearing designs have been constructed to compensate for this pressure gradient condition.

One of the means of overcoming the pressure gradient between inlet and outlet is to provide pressure loadable bearing bushings of the flange type, with the outer flange diameter disposed eccentrically with respect to the inner diameter or barrel portion of the bearing bushing. The periphery of the hub or barrel portion of each pressure loadable bearing bushing is thus located nearer to the inlet side of the pump than to the outlet or discharge side. In this manner, the area that is pressure loaded from discharge pressure, i.e., the rear motive surface of the flange portion, is greater on the outlet side to compensate for the difference in pressure between inlet and outlet, is commonly designated "offset loading" and is described in U.S. Patent 2,823,615 issued to Frederick C. Haberland, February 18, 1958.

In other prior art pressure loaded pumps, the pressure loadable axially movable bearings are moved into sealing engagement with the gears by piston means. An example of the use of pistons is shown in U.S. Patent 2,974,605, issued to J. F. Murray, March 14, 1961. The pistons in this patent are adapted to eccentrically engage the axially movable, pressure loadable, bearing bushings closer to the outlet side of the pump than to the inlet side and move them into sealing engagement with the gear side faces. The sealing engagement is accomplished by utilizing the pressure fluid from the outlet behind the pistons to move them into engagement with the pressure loadable bearings and in turn move the bearings towards the side faces of the gears. In this patent, the outlet fluid pressure is exerted behind the piston and due to the pistons being offset toward the outlet side of the pump, there is a greater force on the outlet side to compensate for the pressure gradient condition.

The offset pressure loading as above-described in the Haberland and Murray patents have certain disadvantages. For example, in the Haberland disclosure wherein the hubs of the bearings are offset toward the inlet sides, close tolerance machining of the cover housing bores is necessary to receive the hubs or barrels of the axially movable bearings. A slight error in positioning of the housing cover bores will tend to misalign the bearings which in turn will cause a substantial reduction in operating efficiency.

In the aforementioned Murray disclosure, which utilizes pistons for offset loading, close tolerance machining of the cover bores is eliminated. In this disclosure, however, the inlet pressure received from the journals enters the cavity between the pistons and the rear surface of their respective bearing bushings, which fluid, in turn, is conveyed to inlet. As a result of this design, i.e., where inlet pressure is directed to the rear surface of the axially movable bearings, there is a substantial amount of leakage to inlet from the outer periphery of the bearings, which in many cases causes a considerable loss of efficiency in total pump output.

Briefly described, this invention is an improved pressure loadable pump which provides offset loading without the aforementioned disadvantages of offset loading. This invention is utilized in pressure loadable pumps having pressure loadable bearings with pressure loading chambers at the rear thereof. In accordance with this invention, fluid pressure confining means are situated in the housing and associated with the axially movable bearings. The pressure confining means are comprised of plate-like base portions having axially extending tubular portions extending outwardly therefrom. The pressure confining means may be provided with one or more tubular portions depending on whether there is one means for the pump or one means for each pressure loadable bearing within the pump. The tubular portions of the pressure confining means are adapted to overlay the journals and circumferentially seal the journals from the rear motive surfaces of the axially movable bearings. The tubular portions are normally provided with flanges as well as sealing rings which fit within inner peripheral bores on the pressure loadable bearings. Thus, the pressure confining means confine pressure within the pressure loading chambers at the rear of the pressure loadable bearings and also confine journal leakage to the rear of the journals.

The pressure confining means may be offset, with respect to the axis of the journal, toward the inlet side of the pump. When the pressure confining means are offset toward the inlet side, a greater surface area on the rear motive surfaces of the axially movable bearings is exposed to high pressure on the outlet side of the pump. This is due to the shielding from high pressure obtained from the pressure confining means. This high pressure on the outlet side exerts a greater force on the bearings on the outlet side of the pump than on the inlet side which in turn substantially eliminates the pressure gradient condition from inlet to outlet.

It will be noted that this invention obviates the alignment problem between the bores and the housing as well as alignment of the bores on the housing cover plate. Further, this invention substantially eliminates peripheral bearing leakage to inlet, which leakage has a tendency to substantially affect the operation of the pump. The bearing leakage as well as alignment problems are eliminated with this invention irrespective of whether the tubular portions of the pressure confining means are offset to eliminate pressure gradient conditions.

The advantages of this invention will become apparent from a reading of the following detailed description taken in connection with the accompanying drawings in which:

FIGURE 1 is an axial cross-sectional view of a pressure loaded pump embodying the teachings of this invention with one embodiment of integral pressure confining means therein;

FIGURE 2 is a fragmentary cross-sectional view taken on line 2—2 of FIGURE 1;

FIGURE 3 is a perspective view of one embodiment of a pressure confining means which is adapted to be utilized in a gear pump as shown in FIGURE 1;

FIGURE 4 is a fragmentary axial cross-sectional view of a pressure loaded pump having a separate pressure confining means for each bearing;

FIGURE 5 is a fragmentary cross-sectional view taken on line 5—5 of FIGURE 4;

FIGURE 6 is a perspective view of one of the pressure confining means utilized in the gear pump of FIGURE 4; and FIGURE 7 is a fragmentary axial cross-sectional view of a pressure loaded pump having the pressure confining means as an integral part of the cover plate; and FIGURE 8 is a perspective view of a fourth embodiment of a pressure confining means which may be utilized in a pressure loaded pump.

Reference is now made to the accompanying drawings wherein like reference numerals are used throughout the figures to indicate like parts, and particular reference is made to FIGURE 1 which illustrates a gear pump generally indicated by the number 10. In accordance with the teachings of this invention, the gear pump is comprised of housing sections 12 and 14 suitably fastened together in aligned relation by means of a plurality of bolts 15 (see FIGURE 2).

The housing section 12 has an end surface 16 which is interrupted by a pair of parallel intersecting bores 18 and 20. Bores 18 and 20 define an end wall 22 within housing section 12.

Rotatable gears 24 and 26 are disposed respectively in the bores 18 and 20 and are adapted to receive fluid from an inlet 28 (shown in FIGURE 2) formed in the housing section 12, pressurize the same, and force the fluid out of an outlet 30 (also shown in FIGURE 2) formed in the housing section 12 in a manner well known in the pump art.

The drive gear 26 has a pair of opposed, substantially flat parallel side faces 32 and 34. Drive gear 26 is also provided with a pair of journals 36 and 38 extending respectively and centrally from the side faces 32 and 34 thereof. Journals 36 and 38 may be formed integrally with gear 26 in a manner well known in the art. Journal 38 comprises an elongated shaft adapted to project through a bore 40 formed in the housing section 14. A suitable power source (not shown) may be coupled to an end 42 of the journal 38 to cause rotation of gear 26. Suitable seal means 44 is carried by the housing section 14 to prevent fluid leakage from the interior of the housing section 14 to the exterior of housing section 14 through bore 40.

The driven gear 24 similar to the drive gear 26 has a pair of opposed substantially flat, parallel side faces 46 and 48 and a pair of journals 50 and 52 extending respectively and centrally from the side faces 46 and 48.

A pair of fixed bearings 54 and 56 are disposed respectively in bores 18 and 20 between wall 22 of housing section 12 and the respective side faces 46 and 32 of gears 24 and 26. Bearings 54 and 56 are provided respectively with a bore 58 and 60 passing therethrough whereby the respective journals 50 and 36 of the gears 24 and 26 are received and rotatably supported therein. Bearings 54 and 56 are provided respectively with substantially flat front faces 62 and 64 which cooperate respectively with the side faces 46 and 32 of the gears 24 and 26 to provide pumping seals therewith. It will be noted that fixed bearings 54 and 56 are provided with relief grooves 55 and 57.

A pair of axially movable pressure loadable bearings 66 and 68 are disposed respectively within bores 18 and 20 in the housing section 12 on the other side of the gears 24 and 26 with respect to the fixed bushings 54 and 56. Bearings 66 and 68 are provided respectively with bores 70 and 72 passing centrally therethrough whereby the bores 70 and 72 are adapted to receive and rotatably support their respective journals 52 and 38 of gears 24 and 26 in a manner well known in the art. Bearings 66 and 68 are provided respectively with substantially flat front faces 74 and 76. There are also rear surfaces 78 and 79 on bearings 66 and rear surfaces 80 and 81 on bearing 68.

Surfaces 79 and 81 on bearings 66 and 68 respectively are provided with bores 67 which contain springs 69 for a purpose hereinafter described.

It may be seen that bearings 56 and 68 together with a portion of housing section 12 defined by bore 20, provide a pumping chamber A for gear 26. Similarly, bearings 54 and 66, together with a portion of housing section 12 defined by bore 18 provide a pumping chamber B.

Housing section 14 is provided with a bore 82 which interrupts an end surface 84 of housing 14. A chamber 86 is formed in housing section 14 within the confines of bore 82, which chamber is in fluid communication with bores 70 and 72.

With respect to FIGURE 1, there is a flange 87 of pressure confining means 88, which flange 87 is carried by housing section 12. The flange 87 of pressure confining means 88 is comprised of a rear surface 90 and a front surface 92 facing the axially movable bearings 66 and 68. The rear surface 90 is sealed from the front surface 92 by means of an O-ring seal 94 in bore 82 of housing section 14. The front surface 92 of flange 87 is sealed from the rear surface 90 at its periphery by means of an O-ring 96. The front surface 92 of flange 87 is provided with tubular portions 98 which terminate in annular flanges 100. Flanges 100 are received within bores 101 and 101a formed in bearings 66 and 68 respectively and are sealed by means of sealing rings 102. Seals 102 prevent pressure from the front surface 92 of the flange 87 on pressure confining means 88 from escaping to the rear surface 90 around the tubular portions 98. There may, in case of high pressure, be a back-up ring 103 associated with the sealing ring 102.

Outlet pressure is adapted to be conveyed to the rear surfaces 79 and 81 of bearings 66 and 68 and in turn to chamber 106. Chamber 106 is formed by the front surface 92 of flange 87 and the rear surfaces of the bearings, outside of flange 100 on tubular portions 87 of pressure confining means 88, and the corresponding bores in the bearings. Outlet pressure is conveyed from the gear chamber outlet side via passage 104 to chamber 106 as shown in FIGURE 2. Any other suitable means such as porting in the housing may be provided to convey outlet pressure to chamber 106.

As shown in FIGURE 1, journal leakage flow at inlet pressure from the pumping chamber is conveyed via axial grooves 59 in bores 70 and 72 and along journals 52 and 38 to chamber 86 formed in the housing section 14 as above-mentioned. In a like manner, leakage flow is also conducted via axial grooves (not shown) in bearings 54 and 56 and along journals 50 and 36 to chamber 109. This leakage passes via journal shaft center hole 111 to chamber 86. From chamber 86, leakage flow at inlet pressure is vented back to the inlet port through a passage 110 which may contain a seal chamber pressurizing valve (not shown) in accordance with a common practice when necessitated for high altitude operation or other reasons. Rear chamber 86 is also sealed from outlet pressure chamber 106 by O-ring seal 94.

The aforementioned leakage flow across the gear faces from high pressure to low pressure as vented through grooves 59 provides lubrication in bores 70 and 72 for journals 52 and 58 respectively. Similar leakage flow provides lubrication of bores 58 and 60 for journals 58 and 36 respectively. This lubricating flow which may also act as a bearing coolant is at low pressure after leaking across the gear faces and is returned to inlet through suitable passages, i.e., such as 110, in a manner as described above.

The force of the outlet pressure conveyed to chamber 106 acts against rear surface 79 on bearing 66 and surface 81 on bearing 68 to force the bearings axially to the left as viewed in FIGURE 1 of the drawing.

Compression springs 69 are disposed in bores 67 of bearings 66 and 68 and one of their ends engages the front surface 92 of the outwardly extending flange 87 of pressure confining means 88 and the other end thereof engages the base of bore 67 within bearings 66 and 68. Springs 69 are utilized when starting the pump, i.e., they cause initial axial movement of movable bearings 66 and 68 to the left as shown in FIGURE 1 to provide a pumping seal with gears 24 and 26. As shown in FIGURE 2, pressure confining means 88 is disposed over bearings 66 and 68 with the two tubular portions 98 disposed eccentrically above journals 52 and 38 in closer proximity to the inlet than to the outlet side of the pump. In this manner, a greater portion of the rear surfaces of the axially movable bearings are exposed to outlet pressure on the outlet side of the pump than are exposed on the inlet side. Thus, a greater pressure is exerted on the bearings on the outlet side of the pump than on the inlet side which compensates for the pressure gradient condition existing from inlet to outlet.

Referring now to FIGURE 4, there is shown a fragmentary cross-sectional view of a pressure loaded pump containing pressure confining means which are separate from each other, each means being utilized with a pressure loadable bearing. Those parts of the pump shown in FIGURE 4 that are similar to the pump shown in FIGURE 1 will be designated with similar numerals.

As shown in FIGURE 4, there are pressure confining means generally designated as 112 associated with each of the pressure loadable bearings 66 and 68. The pressure confining means 112 are comprised of tubular portions 98', which portions terminate in flanges 100' and 116. There is a sealing ring 102', which is adjacent flange 100', identical to sealing ring 102 of FIGURE 1. There is a sealing ring 114 adjacent flange 116, which seal 114 may also be provided with a back-up washer situated between the flange 116 and the sealing ring 114. As indicated with respect to FIGURE 1, back-up washers may be associated with the sealing rings to prevent extrusion thereof at high pressures.

Pressure confining means 112 with flanges thereon confine outlet pressure from inlet on the rear surface 79 of bearing 66 and the rear surface 81 of bearing 68. The outlet pressure acts against the rear motive surface 79 of axially movable bearing 66 as well as rear surface 81 of bearing 68 to move these bearings to the left as shown in the drawing. The operation of the pump shown in FIGURE 4 will be very similar to the operation of the pump in FIGURE 1 which will be described in detail hereinbelow. It will be noted that there is a sealing ring 96' in the pump shown in FIGURE 4, which is similar to sealing ring 96 in FIGURE 1, which prevents leakage between housing sections 12 and 14. Also journal leakage is directed to inlet from chamber 86 via passage 97 as shown in FIGURE 5. The passage 97 is sealed by means of a sealing ring between housing sections 12 and 14 (not shown).

Pressure confining means 112 of FIGURE 4 are offset to the inlet side as shown in FIGURE 5 which in turn leaves a greater surface area on the rear motive surface of bearings 66 and 68 exposed to high pressure on the outlet side. Thus, the outlet pressure exerts a greater force on the bearings within chamber 106' on the outlet side of the pump than on the inlet side thereof. This greater pressure on the outlet side compensates for the pressure gradient condition existing between the inlet and the outlet.

FIGURE 7 is a third embodiment of pressure confining means that may be utilized in this invention. As shown, pressure confining means 118 are terminated in flanges 100" which have sealing rings 102" adjacent thereto. Pressure confining means 118 are separate from the other, however, both are part of housing section 14. It will be noted that a sealing ring such as 114 shown in FIGURE 4 and 94 shown in FIGURE 1 are eliminated inasmuch as leakage between chamber 106 and chamber 86 along the pressure confining means 118 is eliminated by sealing ring 102" alone. This elimination of leakage is due to pressure confining means 118 being an integral part of housing section 14. The operation of the pump shown in FIGURE 7 is essentially the same as that described with respect to FIGURE 1 set forth hereinbelow.

FIGURE 8 is a fourth embodiment of pressure confining means that may be utilized in this invention. As shown, the pressure confining means 120 is a cylindrical tube without flanges as shown in FIGURE 7. The pressure confining means 120 is adapted to fit within the bore 101 of the pressure loaded bearings 66 and 68 as well as a bore 83 in the housing section 14. Confining means 120 is essentially the same as means 112 of FIGURE 6 without flanges 100' and 116. Sealing rings such as 102 and 114 shown in FIGURE 4 fit around the pressure confining means 120 and seal inlet from outlet pressure at the rear of the journals 38 and 52 and bearings 66 and 68. The seals may be provided with back-up rings 103' as shown with respect to confining means 112 in FIGURE 4 or may fit on the outer periphery of confining means 120 within bores 101 and 101a of the bearings 66 and 68 respectively as well as bores 83 and 83' within housing section 14. As indicated with respect to FIGURE 7, the operation of the pump is the same as described with respect to FIGURE 1 hereinbelow.

*Operation*

The operation of the pump shown in FIGURE 1 is illustrative of a mode of operation of this invention in a specific pressure loadable pump, however, other embodiments of pressure confining means such as those shown in FIGURES 4, 7, and 8, as well as others not shown, may be utilized without any substantial change in operation. As shown, journal 38 of drive gear 26 is rotated by a suitable power source (not shown) in a clockwise direction. The driven gear 24 will be rotated in a counterclockwise direction, by the meshing of the gear teeth of gears 24 and 26. As the gears rotate, vacuum is generated by separation of meshed gear teeth which causes fluid to be forced into the opening gear tooth spaces from inlet 28. The fluid thus entrapped between successive pairs of gear teeth is conveyed around the bores 18 and 20 to the outlet 30 in a manner well known in the art.

Fluid conveyed to the outlet 30 is displaced by the action of the intermeshing of the teeth and in turn is transmitted and placed under a high pressure. This outlet pressure is transmitted via passage 104 to chamber 106. The force of the outlet fluid pressure in chamber 106 between the axially movable bearings and the front surface of the pressure confining means 88 acts against the rear motive surface 79 on axially movable bearing 66 as well as surface 81 on axially movable bearing 68. Outlet pressure is retained within chamber 106 and prevented from entering chamber 86 by means of sealing rings 96 and 102 on the pressure confining means 88.

The bearings 66 and 68 are thus moved axially to the left as viewed in FIGURE 1 whereby the bearings are sealingly engaged to the side surfaces 48 and 34 of gears 24 and 26 providing pumping seals therewith.

As is explained above, the offset relation of the tubular portion 98 of pressure confining means 88 and corresponding bores 101 in bearings 66 and 68 is toward the inlet side of the pump in cases where offset loading is utilized. This offset results in a greater force on the outlet side of the pump, thus compensating for the pressure gradient condition existing across the front face of the axially movable bearings from inlet to outlet.

In the prior methods, wherein pistons were utilized on the axially movable bearings, and extended from housing member 12 to housing member 14, it was necessary to align the bearings within the sections. This required the maintenance of extremely close machining tolerances.

Further, misalignment frequently resulted between the axially movable bearings, gear faces and journals. Due to the arrangement of pressure confining means of this invention, within bore 108 of housing section 12, alignment with the axially movable bearings is easily accomplished.

This invention also prevents excessive leakage from front to rear of axially movable bearings which can result in substantial loss in pump efficiency.

This invention has been directed to certain embodiments of fluid pressure confining means that will substantially eliminate the pressure gradient condition existing from inlet to outlet, however, the advantages with respect to alignment and bearing leakage may be obtained irrespective of whether there is a pressure gradient problem. It should, therefore, be understood that the invention is meant to include pressure confining means that are not offset but merely serve as a means of confining outlet pressure at the rear of the pressure loadable bearings and which solve the bearing leakage and alignment problems that normally exist with pressure loaded pumps.

It will be understood that an improved pressure loaded pump has been described with respect to four different embodiments of this invention, however, it should be noted that this is by way of illustration and not by way of limitation and that the scope of this invention is defined solely by the appended claims which should be construed as broadly as the prior art will permit.

I claim:

1. In a pressure loadable gear pump, the combination comprising:
a housing,
means defining a pumping chamber in said housing,
an inlet leading to and an outlet leading from said pumping chamber;
rotatable pumping means disposed in said pumping chamber for drawing fluid from said inlet, pressurizing the fluid and forcing it out said outlet under pressure, said pumping means provided with axially extending journals;
bearing means situated in said housing and adapted for rotatably mounting said journals,
at least one of said bearing means being axially movable pressure loadable bearing means, said pressure loadable bearing means having means associated therewith defining pressure loading chambers at the rear thereof, which loading chamber means are adapted to be subjected to outlet pressure, each of said pressure loadable bearing means also having an inner peripheral bore at the rear thereof;
first fluid communication means between said outlet and said pressure loading chamber means at the rear of said pressure loadable bearing means for directing outlet fluid pressure to said chamber means;
second fluid communication means between said journals and said inlet for directing journal leakage to said inlet;
fluid pressure confining means carried by said housing, said pressure confining means comprising tubular means which extend circumferentially around said journals carrying said pressure loadable bearing means and through said loading chamber means at the rear of said pressure loadable bearings and into said inner peripheral bore at the rear of said pressure loadable bearing, said pressure confining means having sealing means associated therewith and adapted to seal said chamber means from said journals, said tubular means adapted to overlay said axially movable pressure loadable bearings whereby outlet pressure will be communicated to said loading chamber and in turn to the rear of said axially movable bearings to urge said bearings along said journals into sealing engagement with said rotatable pumping means.

2. In a pressure loadable gear pump, the combination comprising:
a housing;
means defining a pumping chamber in said housing;
an inlet leading to and an outlet leading from said pumping chamber;
rotatable pumping means disposed in said pumping chamber for drawing fluid from said inlet, pressurizing the fluid and forcing it out said outlet under pressure, said pumping means provided with axially extending journals;
bearing means situated in said housing and adapted for rotatably mounting said journals;
at least one of said bearing means being axially movable pressure loadable bearing means, said pressure loadable bearing means having means defining circumferentially extending pressure loading chambers at the rear thereof, which chamber means are adapted to be subjected to outlet pressure, each of said pressure loadable bearing means also having an inner peripheral bore at the rear thereof;
first fluid communication means between said outlet and the circumferentially extending pressure loading chamber means of said pressure loadable bearings, for directing outlet fluid pressure to said circumferentially extending chamber means on the rear of said pressure loadable bearings;
second fluid communication means between said journals and said inlet for directing journal leakage to said inlet;
fluid pressure confining means carried by said housing, said fluid pressure confining means comprising tubular means which extend circumferentially around said journals carrying said pressure loadable bearing means and through said circumferentially extending loading chamber means on the rear of said pressure loadable bearings and into said inner peripheral bores at the rear of said pressure loadable bearings, said fluid pressure confining means having sealing means associated therewith and adapted to seal said circumferentially extending loading chamber from said journals, said tubular means adapted to eccentrically overlay said axially movable pressure loadable bearings to place said tubular means in closer proximity to said inlet than to said outlet, whereby a greater portion of the rear surfaces of said axially movable bearings are subjected to outlet pressure on the outlet side of said pumping chamber than on the inlet side of said pumping chamber.

3. In a pressure loadable gear pump, the combination comprising:
a housing;
means defining a pumping chamber in said housing;
an inlet leading to and an outlet leading from said pumping chamber;
rotatable pumping means disposed in said pumping chamber for drawing fluid from said inlet, pressurizing the fluid and forcing it out said outlet under pressure, said pumping means provided with axially extending journals;
bearing means situated in said housing and adapted for rotatably mounting said journals;
at least one of said bearing means being axially movable pressure loadable bearing means, said pressure loadable bearing means having means defining pressure loading circumferentially extending chambers at the rear thereof, which chamber means are adapted to be subjected to outlet pressure, said pressure loadable bearings having an inner peripheral bore formed in the rear thereof;
first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means carried by said housing, said pressure confining means having tubular means thereon, said tubular means extending circumferentially around said journals carrying said pressure loadable bearing means and through said circumferentially extending chamber means at the rear of said pressure loadable bearings, said tubular means terminating in a flange within said inner peripheral bore formed in the rear of said pressure loadable bearings, said tubular means having sealing means associated therewith and adapted to seal said circumferentially extending chamber means from said journals, said tubular means adapted to eccentrically overlay said axially movable bearings to place said tubular means in closer proximity to said inlet than to said outlet, whereby a greater portion of the rear surfaces of said axially movable bearings are subjected to outlet pressure on the outlet side of said pumping chamber than on the inlet side of said pumping chamber.

4. In a pressure loadable gear pump, the combination comprising:

a housing;

means defining a pumping chamber in said housing;

an inlet leading to and an outlet leading from said pumping chamber;

rotatable pumping means disposed in said pumping chamber for drawing fluid from said inlet, pressurizing the fluid and forcing it out said outlet under pressure, said pumping means provided with axially extending journals;

bearing means situated in said housing and adapted for rotatably mounting said journals;

at least one of said bearing means being axially movable pressure loadable bearing means, said pressure loadable bearing means having means defining circumferentially extending pressure loading chambers at the rear thereof, which chamber means are adapted to be subjected to outlet pressure, said pressure loadable bearings having inner peripheral bores formed in the rear thereof;

first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means carried by said housing, said pressure confining means having tubular means thereon, said tubular means extending circumferentially around said journals carrying said pressure loadable bearing means and through said circumferentially extending chamber means at the rear of said pressure loadable bearings, said tubular means terminating in a flange within said inner peripheral bore formed in the rear of said pressure loadable bearings and a flange within said housing on the opposite end, said tubular means having sealing means associated therewith and adapted to seal said circumferentially extending chamber means from said journals, said tubular means adapted to eccentrically overlay said axially movable bearings to place said tubular means in closer proximity to said inlet than to said outlet, whereby a greater portion of the rear surfaces of said axially movable bearings are subjected to outlet pressure on the outlet side of said pumping chamber than on the inlet side of said pumping chamber.

5. In a pressure loadable gear pump, the combination comprising:

a housing;

means defining a pumping chamber in said housing;

an inlet leading to and an outlet leading from said pumping chamber;

rotatable pumping means disposed in said pumping chamber for drawing fluid from said inlet, pressurizing the fluid and forcing it out said outlet under pressure, said pumping means provided with axially extending journals;

bearing means situated in said housing and adapted for rotatably mounting said journals;

at least one of said bearing means being axially movable pressure loadable bearing means, said pressure loadable bearing means having means defining pressure loading circumferentially extending chambers at the rear thereof, which chamber means are adapted to be subjected to outlet pressure, said pressure loadable bearings having inner peripheral bores formed in the rear thereof;

first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means which are an integral part of said housing, said pressure confining means having tubular means thereon, said tubular means extending circumferentially around said journals carrying said pressure loadable bearing means and through said circumferentially extending chamber means at the rear of said pressure loadable bearings, said tubular means terminating in a flange within said inner peripheral bore formed in the rear of said pressure loadable bearings, said tubular means having sealing means associated therewith and adapted to seal said circumferentially extending chamber means from said journals, said tubular means adapted to eccentrically overlay said axially movable bearings to place said tubular means in closer proximity to said inlet than to said outlet, whereby a greater portion of the rear surfaces of said axially movable bearings are subjected to outlet pressure on the outlet side of said pumping chamber than on the inlet side of said pumping chamber.

6. In a pressure loadable gear pump, the combination comprising:

a housing;

means defining a pumping chamber in said housing;

an inlet leading to and an outlet leading from said pumping chamber;

rotatable pumping means disposed in said pumping chamber for drawing fluid from said inlet, pressurizing the fluid and forcing it out said outlet under pressure, said pumping means provided with axially extending journals;

bearing means situated in said housing and adapted for rotatably mounting said journals;

at least one of said bearing means being axially movable pressure loadable bearing means, said pressure loadable bearing means having means defining pressure loading circumferentially extending chambers at the rear thereof, which chamber means are adapted to be subjected to outlet pressure, said pressure loadable bearings having inner peripheral bores formed in the rear thereof;

first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means carried by said housing, said pressure confining means having tubular means thereon, said tubular means extending circumferentially around said journals carrying said pressure loadable bearing means and through said circumferentially extending chamber means at the rear of said pressure loadable bearings and into said inner peripheral bores at the rear of said pressure loadable bearings, said tubular means having sealing means associated therewith and adapted to seal said circumferentially extending chamber means from said journals, said tubular means adapted to eccentrically overlay said axially movable bearings to place said tubular means in closer proximity to said inlet than to said outlet, whereby a greater portion of the rear surfaces of said axially movable bearings are subjected to outlet pressure on the outlet side of said pumping chamber than on the inlet side of said pumping chamber.

7. In a pressure loadable gear pump, the combination comprising:

a housing;

means defining a pumping chamber in said housing;

an inlet leading to and an outlet leading from said pumping chamber;

rotatable pumping means disposed in said pumping chamber for drawing fluid from said inlet, pressurizing the fluid and forcing it out said outlet under pressure, said pumping means provided with axially extending journals;

bearing means situated in said housing and adapted for rotatably mounting said journals;

at least one of said bearing means being axially movable pressure loadable bearing means, said pressure loadable bearing means having means defining pressure loading circumferentially extending chambers at the rear thereof, which chamber means are adapted to be subjected to outlet pressure, said pressure loadable bearings having inner peripheral bores formed in the rear thereof;

first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means carried by said housing, said pressure confining means having tubular means thereon, said tubular means extending circumferentially around said journals carrying said pressure loadable bearing means and through said circumferentially extending chamber means at the rear of said pressure loadable bearings and into said inner peripheral bores on said pressure loadable bearings, said tubular means terminating in a flange within said bore formed in the rear of said pressure loadable bearings and a flange within said housing on the opposite end, said tubular means having sealing means associated therewith adapted to seal said circumferentially extending chamber means from said journals, said tubular means adapted to concentrically overlay said axially movable bearings.

8. In a pressure loadable gear pump, the combination comprising:

a housing;

means defining a pumping chamber in said housing;

an inlet leading to and an outlet leading from said pumping chamber;

rotatable pumping means disposed in said pumping chamber for drawing fluid from said inlet, pressurizing the fluid and forcing it out said outlet under pressure, said pumping means provided with axially extending journals;

bearing means situated in said housing and adapted for rotatably mounting said journals;

at least one of said bearing means being axially movable pressure loadable bearing means, said pressure loadable bearing means having means defining pressure loading circumferentially extending chambers at the rear thereof, which chamber means are adapted to be subjected to outlet pressure, said pressure loadable bearings having a bore formed in the rear thereof;

first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means which are an integral part of said housing, said pressure confining means having tubular means thereon, said tubular means extending circumferentially around said journals carrying said pressure loadable bearing means and through said circumferentially extending chamber means at the rear of said pressure loadable bearings, said tubular means terminating in a flange within said bore formed in the rear of said pressure loadable bearings, said tubular means having sealing means associated therewith adapted to seal said circumferentially extending chamber means from said journals, said tubular means adapted to concentrically overlay said axially movable bearings.

9. In a pressure loadable gear pump, the combination comprising:

a housing;

means defining a pumping chamber in said housing;

an inlet leading to and an outlet leading from said pumping chamber;

rotatable pumping means disposed in said pumping chamber for drawing fluid from said inlet, pressurizing the fluid and forcing it out said outlet under pressure, said pumping means provided with axially extending journals;

bearing means situated in said housing and adapted for rotatably mounting said journals;

at least one of said bearing means being axially movable pressure loadable bearing means, said pressure loadable bearing means having means defining pressure loadable circumferentially extending chambers at the rear thereof, which chamber means are adapted to be subjected to outlet pressure, said pressure loadable bearings having inner peripheral bores formed in the rear thereof;

first fluid communication means between said outlet and the circumferentially extending pressure loading chamber means of said pressure loadable bearings, for directing outlet fluid pressure to said circumferentially extending chamber means at the rear of said pressure loadable bearings;

second fluid communication means between said journals and said inlet for directing journal leakage to said inlet;

fluid pressure confining means carried by said housing, said pressure confining means having tubular means thereon, said tubular means extending circumferentially around said journals carrying said pressure loadable bearing means and through said circumferentially extending chamber means at the rear of said pressure loadable bearings and into said inner peripheral bores at the rear of said pressure loadable bearings, said tubular means having sealing means associated therewith adapted to seal said circumferentially extending chamber means from said journals, said tubular means adapted to concentrically overlay said axially movable bearings.

References Cited by the Examiner

UNITED STATES PATENTS

| | | | |
|---|---|---|---|
| 2,695,566 | 11/1954 | Compton | 103—126 |
| 2,881,704 | 4/1959 | Murray | 103—126 |
| 3,051,091 | 8/1962 | Bennett et al. | 103—126 |
| 3,083,645 | 4/1963 | Donner et al. | 103—126 |
| 3,172,366 | 3/1965 | Laumont | 103—126 |
| 3,194,168 | 7/1965 | Rosaen | 103—126 |

FOREIGN PATENTS

| | | |
|---|---|---|
| 782,701 | 9/1957 | Great Britain. |
| 932,156 | 7/1963 | Great Britain. |

MARK NEWMAN, *Primary Examiner.*
WILBUR J. GOODLIN, *Examiner.*